United States Patent [19]

Kos

[11] Patent Number: 5,002,020

[45] Date of Patent: Mar. 26, 1991

[54] COMPUTER OPTIMIZED HYBRID ENGINE

[76] Inventor: Joseph F. Kos, 4047 Elphinstone St., Regina, Saskatchewan, Canada, S4S 3L1

[21] Appl. No.: 556,872

[22] Filed: Jul. 20, 1990

Related U.S. Application Data

[63] Continuation of Ser. No. 336,809, Apr. 12, 1989, abandoned.

[30] Foreign Application Priority Data

Apr. 26, 1988 [GB] United Kingdom ............... 8809793

[51] Int. Cl.$^5$ ........................................... F02B 71/00
[52] U.S. Cl. ..................................... 123/46 E; 123/3
[58] Field of Search ............... 123/46 E, 46 A, 46 R, 123/3

[56] References Cited

U.S. PATENT DOCUMENTS

4,567,726  2/1986  Vitale et al. ........................ 60/520

FOREIGN PATENT DOCUMENTS

880154  10/1961  United Kingdom .
1357957  6/1974  United Kingdom .

Primary Examiner—David A. Okonsky
Attorney, Agent, or Firm—Irell & Manella

[57] ABSTRACT

This invention is a hybrid engine employing a reciprocating piston in conjunction with an electromagnetic transducer for control and power output. The transducer is essentially a specialized linear motor/generator. The piston is rigidly connected by means of a rod to a permanent magnet (or equivalent). The piston-rod-magnet unit is constrained by bearings to move translationally along one axis. The magnet can move linearly into and out of the yoke of the magnetic transducer to generate an electric current in the windings of the yoke. At the same time computer control of the effective impendences of these windings as well as computer controlled currents (provided by an electric storage battery or electrical energy storage indicator) flowing through some (or all) of these windings control the motion of the magnet and hence of the piston. Computer control is also exercised over other devices to regulate ignition timing, fuel injection, air intake, valve motion, etc. The power output may be used to drive A.C., D.C. or A.C./D.C. motors or it may be wholly or partially rectified to charge batteries and/or power A.C./D.C. or D.C. motors or to power other devices.

38 Claims, 2 Drawing Sheets

COMPUTER OPTIMIZED HYBRID ENGINE

This application is a continuation of application Ser. No. 336,809, filed 04/12/89, now abandoned.

This invention relates to new and useful improvements in internal combustion engines and provides the basis of a systems approach to optimize engine reliability, efficiency, pollution control, versatility, manufacturing costs and operating costs.

BACKGROUND OF THE INVENTION

During the past century, internal combustion engines have proliferated. Their general replacement of external combustion engines can be attributed to advantages they offer in efficiency, power-to-size ratio, versatility, and the like. The use of connecting rod and crankshaft, with camshaft control to deliver power from reciprocating pistons has been eminently successful as attested by widespread use. However this arrangement which has been so successful in its time imposes certain limitations (particularly on the efficiency and pollution control of engines) which are very difficult to overcome. On the other hand the enormous expansion of technical civilization throughout the world has alerted mankind to the need for conservation of non-renewable resources and to the dire need for pollution control.

To accommodate these sociological requirements by reducing the limitations of present day engines requires a "quantum leap" in engine design such as occurred in the transition from external to internal combustion engines.

The present invention provides the basis for the design changes required to optimize the operating characteristics and manufacturing conditions of engines using presently available technology and materials and permits additional improvements as more advanced materials and technology become available.

Optimization of efficiency and minimization of pollution associated with combustion and thermodynamic processes which occur in the combustion chamber portion of the cylinder requires control of piston motion, of valve motion, of fuel injection, of ignition and the like to a degree which mechanical systems have not been able to provide in a practical manner.

Many inventors have recognized these problems and offered partial and piecemeal solutions. A particularly interesting solution is proposed by G. F. Chatfield in U.S. Pat. No. 4,459,945 where a good discussion of limitations of the rod-crankshaft-camshaft arrangement is presented (see also references therein). That discussion deals with "timing loses", "heat losses" and "volumetric efficiency" as a function of engine speed. Chatfield's invention replaces the rod-crankshaft mechanism by special cams and yokes to obtain better control of piston velocity within the cylinder For different applications and conditions, cams of different shape are required and each special cam provides only limited control of piston motion. Moreover his invention does not address the question of improved control of ignition, fuel injection, valve motion, and the like.

The limits to efficiency due to the "angular and moment arm changes that the conventional connecting rod undergoes in its relationship with the power output shaft and power piston" have been discussed by R. L. Giulianna et al. in U.S. Pat. No. 4,498,430 (and references cited therein). Their invention provides a partial solution to this problem (impedance matching between power source and load as a function of time) using a very complicated mechanical device which, of course, introduces additional frictional losses, and also impacts unfavorably on manufacturing cost and reliability.

Both of the aforementioned patents also promise improved pollution control through longer piston stroke. It is well known that a longer stroke allows the remaining fuel to burn at a lower temperature near the end of the stroke.

At lower temperatures, chemical equilibrium is shifted to the region where combustion is more complete and a smaller fraction of harmful pollutants are emitted. However the reduction of carbon dioxide emission can only be achieved by improving efficiency and with the use of fuels such as natural gas (methane) which burns with the production of less carbon dioxide per B.T.U. than gasoline. A long stroke also permits a lower exhaust temperature increasing the thermodynamic limit to maximum efficiency. It is evident that optimum pollution control can only be obtained by exact control of all pertinent engine parameters.

Attempts to improve efficiency by "adjustment of the compression ratio" (automatically or otherwise) are described by J. W. Akkerman in Canadian Patent No. 1,180,963 and references therein. That invention also requires a complicated mechanical mechanism which deals with the problem of providing an optimum pressure in the firing chamber at the instant of firing.

The problems of efficiency and pollution control have been addressed by numerous other inventors. S. Konther et al in U.S. Pat. No. 4,408,578 describe a complicated mechanism to change linear motion to rotational motion. A. J. Crocker in U.S. Pat. No. 4,381,740 provides greater time for the power portion of engine cycle, than for the exhaust portion of the engine cycle through the use of complicated linkages.

All previous inventions have approached the problems of engine design in a piecemeal fashion and have not provided sufficient control to achieve optimal operating conditions. Moreover the partial solution of one problem generally exacerbates other problems, for example a complicated mechanical mechanism is introduced and its use reduced the reliability of the engine and increases its manufacturing cost or pollution control is achieved using a catalytic converter which reduced the efficiency of the engine thereby producing a larger quantity of carbon dioxide exhaust for a given energy output.

It has also been widely recognized that, for automotive purposes, electric powered cars offer high energy conversion efficiency and low pollution contingent on the requirement that the original electric power is no produced by the combustion of fossil fuel. (Electric automobiles, William Hamilton. McGraw-Hill Book Co. New York (1980) and Electric Vehical Technology, J. E. Unnewehr and S. A. Nasar, John Wiley and Sons. New York (1982). The well known difficulties associated with adequate energy supply (batteries and fuel cells) for automobiles have greatly limited the use of electric vehicles and have stimulated inventions of what we shall refer to as quasi-hybrid power trains in which conventional engines power an electric generator which in turn provides electric power to an electric motor, charges a battery or both.

In these inventions some power efficiency and pollution control is achieved by operating the internal combustion engine under strict limits of speed and the like, and additional power requirements are provided by the electric storage battery. Unfortunately the watthour efficiency of most types of batteries is relatively low (in the 70% to 85% range). For example the watthour efficiency of lead-acid batteries from full charge to discharge is only about 75% to 80%, although these values may be somewhat higher under cyclic duty. (Mark's Standard Handbook for Mechanical Engineers, Eight Edition, Mc-Graw-Hill Book Co.) This efficiency limitation, as well as the additional weight, cost, inconvenience and the complications of utilizing essentially two separate, but linked power units has limited the use of these quasi-hybrid systems for automotive use. (Electric and Hybrid Vehicles (Energy Technology Review #44), Edited by M. J. Collie, Noyes Data Corporation, Park Ridge, N.J. 07656 (1979)).

Considerable effort has also been expended in the development of Stirling engines in which linear motion pistons transfer power directly into a linear electric motor/generator unit (E. H. Cook-Yarborough et al Proc. I.E.E., Vol. 121. No. 7, July 1974, p.749; George R. Dochat, SAE Technical Paper, No. 810457, International Congress and Exposition, Detroit Mich. Feb 1981; Machine Design Sept. 11, 1986 p.48).

These designs demonstrate the technical feasibility of linear motor/generators for the conversion of thermal to electric power. However they are limited to operating at a constant resonant frequency with constant power output. In addition the energy efficiency of Stirling engines is inherently lower than that of internal combustion engines where the effectively higher combustion temperature determines a higher Carnot efficiency. The Jarret proposal which overcomes the latter disadvantage is still subject to the former (Jan. P. Norbye, Autocar 22 Mar. 1980 P.47).

The above and similar proposals such as The Stelzer motor (Science and Mechanics Nov.-Dec. 1983) all lack a fundamental ingredient which is necessary to provide the versatility required for various practical applications and to allow an optimization of desired characteristics. That ingredient is precise control of the engine's operating parameters.

It is an object of this invention to create a thermo-electro-mechanical engine (or operating in reverse, a pump or compressor, such as utilized in air conditioning and refrigerator units) which forms the basis for numerous improvements in efficiency, pollution control, reliability, versatility, cost effectiveness in operation etc.

It is a second object of this invention to create a thermo-electro-mechanical engine which is easily amenable to comprehensive computer control.

It is an object of this invention to create a thermo-electro-mechanical engine of extreme mechanical simplicity with essentially only one moving part per cylinder associated with the power train (apart from electric drive motor(s) for mobile use) and therefore to provide in optimal manner for improved mechanical reliability, decreased frictional losses, decreased cooling requirements, decreased cost of production and operation, modular installation, and most of all for adaptability to comprehensive computer control (which can only be easily achieved when the mechanical system is so simple that jerk and backlash are negligibly small and therefore do not interfere with the flow of information from and to the computer) and therefore satisfy the second stated object of this invention.

It is an object of this invention to create a thermo-electro-mechanical engine of sufficient mechanical simplicity and reproductibility of operation as to encourage and expedite research into thermodynamic and chemical processes occurring in the cylinder and into the effects of combustion chamber design and operation, the effects of various fuels and the effects of various ignition and valving systems on those processes, and to harness presently available materials and technology in an optimal manner and to provide impetus for the development of new technology and advanced materials to accomplish the first stated object to the highest possible degree.

It is an object of this invention to create a thermo-electro-mechanical engine which may function (i) as an Otto-cycle engine (or "gasoline engine") (ii) as a Diesel engine, (iii) as a Stirling engine, (iv) as a Rankine engine, (v) as any other such engine (which may or may not incorporate some or all of the characteristics of one or more of the above), and to function in all the various possible configurations of the above engines such as four cylinder or six cylinder configurations, and to function in the various modes of operation of these engines such as the 2 cycle or 4-cycle operation etc. and to function as air-cooled, water cooled etc. engines.

It is an object of this invention to create a thermo-electro-mechanical engine which can be used as a stationary engine (i.e. primarily for the generation of electric power or to power a hydraulic pump or the like, or which can be used in mobile applications (i.e. to power automobiles, ships, airplanes, and the like).

DISCLOSURE OF THE INVENTION

Briefly, this invention relates to a true hybrid engine in which the energy supply advantages of fuel burning engines are integrally combined with the advantages of electric powered units to produce a simple power system under complete computer control in which all parts of the system can respond virtually instantaneously (and essentially without backlash or jerk) to computer instructions and in which the computer receives virtually instantaneous information about the operations of all pertinent parts of the system.

This invention represents a holistic solution to many problems encountered with engines. It provides improvements in efficiency and pollution control in conjunction with (not at the expense of) increased simplicity, reliability, versatility and lower manufacturing and operating costs. Where a trade-off between the degree of two or more desirable quantities is unavoidable, the simplicity of this invention allows realistic calculations to be carried out and engines to be designed which balance the desired qualities according to an overall optimization process.

In accordance with one aspect of the invention, there is provided, in an internal combustion engine which includes at least one cylinder, a piston reciprocal therein, fuel and air intake means operatively connected to said cylinder, exhaust gas means also operatively connected to said cylinder and a source of fuel/air ignition also operatively connected to said cylinder; the improvement comprising in combination, support structure, a connecting rod secured by one end to said piston and reciprocal therewith along a common axis, bearing means mounted on said supporting structure for supporting said connecting rod for reciprocal movement, a transducer in the form of a linear generator, which includes a magnet, operatively secured to said connecting rod and being reciprocal therewith, and a yoke and coil combination mounted on said supporting structure in a stationary, operative relationship with said magnet, a position indicator also on said supporting structure, operatively connected to said connecting rod for indicating at selected locations and/or time intervals, the position, speed and acceleration of said piston rod as a function of time, and computer means operatively connected to said position indicator and to said engine to control the operational characteristics of said engine depending upon the operation requirement parameters at any given time frame of operation.

In accordance with a further aspect of the invention, there is provided an internal combustion engine which includes at least one cylinder, a piston reciprocal therein, fuel and air intake means operatively connected to said cylinder, means to exhaust gases from said cylinder and a source of fuel/air ignition also operatively connected to said cylinder, a connecting rod secured by one end thereof to said piston and reciprocal therewith along a common axis, bearing means mounted on said supporting structure for supporting said rod for said reciprocal movement, a transducer in the form of a linear generator, which includes a magnet, operatively secured to said connecting rod and being reciprocal therewith, and a yoke and coil combination mounted on said supporting structure in a stationary, operative relationship with said magnet, a position indicator also on said supporting structure operatively connected to said connecting rod for indicating at selected locations and/or time intervals, the position, speed and acceleration of said piston rod as a function of time, and computer means operatively connected to said position indicator and to said engine to control the operational characteristics of said engine depending upon the operating requirement parameters at any given time frame of operation.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

In its simplest configuration (FIG. 1) a piston 10, having piston rings (not illustrated), is engaged within cylinder 11 with electromagnetically operated and computer controlled valves, ignition and fuel injection system indicated schematically and attached rigidly to a permanent magnet 12 by means of a connecting rod 13 of appropriate shape supported by bearings 14 and 15 to undergo oscillatory linear motion during which the magnet 12 with its N and S poles as indicated, is moved into and out of a yoke 16 made of appropriate magnetic material (such as transformer steel) and on which wires 17 of appropriate conducting material (such as copper, aluminum, superconducting ceramic, etc.) have been wound in a conventional manner. Reference character 18 shows a position indicator (or position/velocity/acceleration indicator), which is conventional. Support structure S is also shown schematically.

Figure 1:
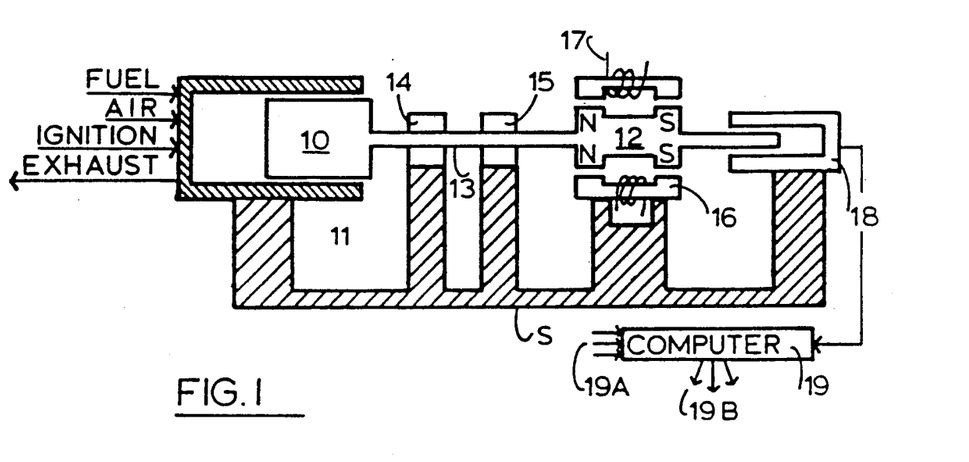
FIG. 1 is a schematic side-elevation of a single cylinder embodiment of the invention.

The engine as described above (and illustrated using diagrams which are only schematic in nature) has been highly simplified in order to facilitate an elucidation of, and provide an uncluttered explanation of the principles of this invention. In practice a considerable amount of engineering design must be applied to all aspects of this engine. For example, in an actual engine the "magnet-yoke" transducer (12, 16, 17) is replaced by a properly engineered specialized linear motor/generator unit. The above comments will also be taken to apply to many of the simplified designs discussed in the remainder of this document. Also, the necessary valve systems together with carburation (fuel injection) and ignition systems (not illustrated) will be required for the engine to operate. Furthermore, to be specific, the descriptions will be based on an engine appropriate for use in automobiles, although it is not limited to this application.

(a) The Linear Motor/Generator

The simplified magnet-yoke representation is not intended to limit the type of linear motor/generator unit which may be used. For example linear motor/generators of the moving coil, induction, synchronous, or the variable reluctance types and the like, may prove superior for certain applications. In addition, the magnet-yoke representation is not intended to limit the type of output of the linear motor/generator envisaged for actual engines. It may be a D.C. output; a rippled D.C. output; an A.C. output, or the like.

By "specialized linear motor/generator" it is meant transducer units which may have auxiliary power input/output windings, for example, to provide power for computer control of piston motion and incorporate windings for short interval (of the order of one cycle) storage of energy. In addition, provision will be made for switching the output windings into various combinations of series and parallel connection and directing the outputs in appropriate ratios to the drive motors and storage battery.

In the present simplified representation the motion of the magnet through the transducer yoke generates electric currents in the wires. The characteristics of the currents will depend on design (number of windings, size of magnet and the like) and on operation (speed and frequency of the passage of the magnet through the yoke, the number of windings switched by computer into series and/or parallel connection at any instant, additional current flows (supplied by the storage battery) through the windings, instantaneous load, computer control of impedance-devices in the input and/or output circuits of the motor/generator unit, and the like).

The power output of the transducer will depend on the size of the permanent magnet and the energy product of the material of which it is made (with care taken to insure that the magnetic circuit of the yoke is adequate for the purpose). Using advanced magnetic materials such as Magnequench MQ III (trademark) produced by Delco Remy a power output as high as 10 kilowatts per cylinder can be obtained with a magnet of very reasonable size and weight.

(b) The Cylinder

The cylinder 11 must be appropriate for the fuel used and the type of engine required. For an Otto cycle (or gasoline type) engine it must contain the appropriate combustion chamber, valves and spark plug. For a Diesel type engine it must accept the diesel fuel injection system and contain the other required elements. For a Stirling type engine the cylinder 11 must represent the appropriate heat generator, heat exchanger etc.

(c) The Bearing Mounts and Piston.

The bearings 14 and 15 allow linear oscillatory motion of the piston-magnet system. They relieve the piston rings almost entirely of their "bearing" function and allow them and the piston to be made of more suitable materials. The piston rings may now be used primarily in the sealing function. Under these conditions piston ring wear and lubrication requirements are minimized permitting higher cylinder pressures and temperatures in order to attain higher thermodynamic efficiency and more reliable high speed operation. In contrast conventional engines suffer from the sideways thrust of pistons against cylinder walls (in the conversion of linear to circular motion from piston to rod to camshaft). This sideways motion results in vibration, considerable friction and heat generation, as well as in wear of the rings and cylinder. In an actual engine the placement of the bearing mounts must be determined by requirements of mechanical stability and lubrication rather than as shown in the schematic.

(d) The Position/Speed/Acceleration Indicator

A position/speed/acceleration indicator 18 is operatively attached to the piston rod connecting 13 and provides the computer 19 with virtually instantaneous information as to the position, speed and acceleration of the piston 10 as a function of time and as a function of its position with respect to the cylinder 11. In practice an accurate position indicator may be sufficient. The computer 19 should incorporate an accurate clock and may be programmed to differentiate the position data twice; once to provide velocity values and the second time to generate values of acceleration. The indicator itself may be an electro-optical device similar to that used in audio disc players or it may be an electronic device such as a cavity resonator or capacitive position indicator.

Additional data (as required) from various parts of the system (power, torque and speed requirements, valve motion and the like, and using various indicators as required (not illustrated), is also input into the computer 19A. From this information the computer can calculate the required stroke length, frequency of oscillation, compression ratio, ignition timing, fuel and air requirements, valve motion and the like, in order to operate the engine under the desired conditions and in an optimal manner 19B. For example, because of the inertia of mechanical parts, such as valves, the signal to open or close valves must be given slightly in advance of the optimum time at which they should be opened or closed. The magnitude of the signal advance will depend on engine speed and other such factors. The signal advance can be calculated by the computer taking into account the desired operating conditions. These kinds of design requirements apply to many aspects of this proposed optimized engine but particularly to the control of the ignition timing. It is well known that the amount of ignition timing advance is crucial to the optimization of efficiency and power output. The technology is herewith provided to control continuously the amount of ignition timing advance as a function of engine speed (and other factors) for optimum operation.

Control of piston position and speed relative to the cylinder and relative to ignition timing will allow better "impedance matching" in the transfer of thermal energy generated in the cylinder, to the piston-motor/generator (reducing and widening the sharp spike in the pressure volume diagrams representing the thermodynamic processes in the cylinder). The power to move the piston 10 through the optimum positions in the cylinder 11 as a function of time will be provided by electrical energy stored in some of the motor/generator windings (designed for this purpose) and/or from a separate electrical energy storage inductor (not illustrated), as well as (in large part) from the energy provided by combustion.

A continuous monitoring of all relevant parts of the system will permit optimal operation under a wide variety of conditions (perhaps even taking into account effects due to ambient temperature and the height of the engine above sea level).

(e) The Computer

In order to carry out the required calculations and functions particularly as related to the determination of the position and speed of the piston 10 a fast computer 19 with relatively large memory is required. However after the characteristics of an engine are determined during the design and development stage, function protocols can be developed to relieve the computer of many of its initial tasks and calculations. For example once the characteristics of piston motion within the cylinder are determined for an engine of given type and under certain operating conditions it will not be necessary to determine the exact position, speed and acceleration at thousands of points during one stroke. Rather, the information obtained during experimental runs can be used to develop an equation (mathematical model) describing the piston motion which along with far fewer data points will enable the computer to carry out its optimization procedures. Moreover, the optimization procedures need not be finalized after one stroke but may be developed through successively better approximation as the engine runs through hundreds of strokes. The development of such models and protocols will allow the use of a reasonably inexpensive on board computer system for production models.

(f) Starter Motor and Transmission

With proper transducer (specialized linear motor/generator) design a conventional starter motor is not necessarily required; rather current from the storage battery may be passed through the windings of the yoke 16 to push the magnet-piston unit toward the cylinder (motor mode) to compress the fuel air mixture for initial ignition.

Figure 2:
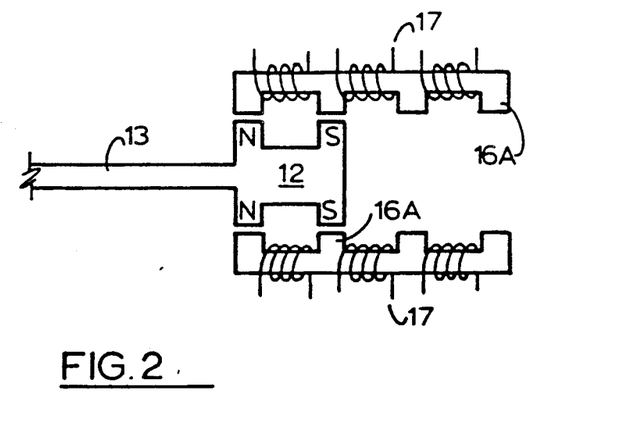
FIG. 2 is an enlarged schematic side-elevation of a modified linear motor/generator yoke magnet piece.

To better extract all of the available energy provided by combustion, using a magnet of moderate size, a multipole yoke 16A (FIG. 2), (or multipole magnet and multipole yoke) may be used. In actual engines the multipole yoke will correspond to a multipole motor/generator. The number of poles will be determined by the function of the engine, the desired stroke length, geometric restrictions, the requirements for an adequate magnetic circuit in the yoke etc. In this connection it is noted that for a given initial cylinder pressure a longer stroke corresponds to a higher thermodynamic efficiency and better pollution control.

Correct transducer design allows proper impedance matching (as a function of time) between power source and load by computer controlled switching of the correct number of transducer windings (parallel and series connections) into appropriate connections with the load and battery and possibly supplementary electrical energy storage devices (inductance or conventional motor/generator) as a function of load requirements. This system essentially provides a continuously variable automatic transmission. Since D.C. motors produce high torque at low revolutions, in most applications an additional mechanical transmission will not be required. In this regard it is noted that conventional transmissions (manual, automatic, or continuously variable automatic transmissions) are generally less than 90% efficient, whereas linear motor/generators can be designed with efficiencies exceeding 98%. (Linear Motion Electric Machines, S. A. Nasar and J. Boldea, John Wiley and Sons 1976)).

Proper transducer design will also allow the computer 19 to operate the engine at an optimal speed for maximum efficiency and minimum pollution. For automotive applications the speed need not be changed inasmuch as additional power requirements to the electric drive motor(s) (not illustrated) (i.e. for accelerating or for climbing hills) can be supplied by the battery, while surplus power produced (when waiting for a green light or in a downhill run) can be used to charge the battery. If little excess power (excess voltage) is available, the computer 19 (which monitors each cell of the battery) can divert this excess power selectively to a certain cell (or cells) requiring it most.

Cells of the battery (not illustrated) can also be charged during braking. When brakes are applied the electric drive motors may be switched into electric generator mode to provide some or all of the torque requirement for braking and at the same time generate electricity which can be stored in the battery. This type of braking is superior, particularly under slippery road conditions, since the rear wheels will not continue to drive as brakes are applied.

(g) Engine Configuration

Vibration Reduction

In its elementary form (FIG. 1) the single piston engine would produce an unacceptable degree of vibration. However if two such systems are mounted along a common axis to form a module (for example with cylinder heads at opposite ends) and operated exactly in opposition with ignition timing synchronized (so that the motion of one piston is the mirror image of the other) vibrations can be reduced to negligible levels. In this configuration the two pistons can also input into a common motor/generator if it is designed for this purpose.

Other vibration free arrangements are also possible. For example, four single-piston units may be mounted (two side-by-side and another two symmetrically placed over the first two) to produce a vibrationless module. In this case the two diametrically opposite units would operate in unison and exactly 180 out-of phase with the other two units. This arrangement results in a shorter engine than possible with the end-to-end configuration.

In a preferred embodiment (FIG. 3) two pistons 10A and 10B, are attached to one motor/generator 20 (transducer such as in FIG. 2), by inline connecting rods 13, in order to reduce the number of transducers and to obtain a longer (improved) mechanical mount for the pistons unit. These pistons engage within opposed cylinders 11A and 11B as shown. Two (or four) such units (mounted in the same way as described above for the single piston units are required to form a vibrationless module and the modules may be banked in any number to service expected power requirements. For example, for short runs the batteries may be charged from household electric supply and none of the power modules need be carried. For more extended runs or for interrupted runs (i.e. in delivery vans) one or two modules may be carried. For extended or intercity runs at high speeds a large number of modules may be carried. Furthermore the operator could be given the opportunity to select and pay for the power package most suitable to his vehicle and his requirements with subsequent add-on capability. Also, the same modules can be banked in different numbers for vehicles of varying size.

(h) Multifuel Operation

Computer control of engine parameters also permits easy and convenient multifuel operation. This invention allows the use of programmed computer protocols which might be dashboard selected to accommodate the use of various fuels such as gasohol, propane, natural gas, methanol, etc., as well as gasoline. In areas where natural gas is inexpensive a low pressure tank may be filled from a household outlet. (See schematic inputs signals 19A and output signals 19B.)

The versatility provided by this invention may be utilized by governments to achieve low urban pollution by adjusting gasoline taxes to encourage the use of household electrical supplies, solar cells mounted on vehicles and the like and/or as replacements for fossil fuel sources.

(i) Method of Operation

In its simplest form and operated as a 4-cycle Otto type engine the unit (FIG. 1) may be operated as follows. The motor/generator or transducer (12, 16, 17) (in motor mode.) draws current from the battery to move piston 10 into cylinder 11 expelling combustion products (the exhaust stroke may be longer than the compression stroke in order to expel the maximum amount of combustion product and therefore increase the volumetric efficiency). It then moves the piston in the opposite direction (not necessarily through its maximum stroke) as the inlet valve (not illustrated) opens to fill the cylinder 11 with a combustible mixture. The motor/generator then moves the piston 10 back into the cylinder 11 to compress the mixture which is ignited at the proper moment and the motor/generator and combustion pressure may (if required) combine momentarily to move the piston out of the cylinder to give it a large initial velocity (and therefore reduce the time during which the highest temperatures and pressures exist in the cylinder). As the piston moves outwardly, the motor/generator reverts entirely to the generator mode producing energy which is supplied to the drive motors (not illustrated) and/or stored in the battery (not illustrated). Some of this energy may be also be stored in an electrical inductor (not illustrated) and/or in inductive windings of the motor/generator, or in the form of kinetic energy in the drive motors which can return it when they are switched into generator mode, or a separate conventional motor/generator (not illustrated) may be employed for short duration storage of energy in the form of kinetic energy. At the end of the piston power stroke the motor/generator (in motor mode) now moves the piston 10 into the cylinder to exhaust the combustion products and moves it in the opposite direction in order to fill the cylinder 11 with combustible mixture, then again compresses this mixture for combustion. In these latter three operations the motor/generator may draw energy from the battery. However it would be preferable to draw it from a separate electrical energy storage system because such systems can be designed to lose very little energy during one cycle. Inductive energy storage systems can be 99% efficient during one cycle, whereas battery storage and retrieval may dissipate as much as 10% to 20% of the energy required for these three operations. Finally, combustion again occurs to produce another power stroke It should be noted that the short interval electrical energy storage plays the same role as a flywheel in the more conventional engine but that it is not limited in the same way as the mechanical flywheel which over short intervals must have an almost constant angular speed and subjects the piston to a mechanically determined speed (as a function of position in the cylinder) and a constant length stroke for all parts of the cycle.

DESIGN CONSIDERATIONS

The maximum speed of a conventional engine is limited by the mass of the piston-rod unit. In the proposed invention a similar limitation is imposed by the mass of the piston-rod-magnet unit. An estimate of the maximum speed can be obtained for a simple model (pertaining to FIG. 3) in which it is assumed that the energy provided by combustion is transformed entirely into kinetic energy of the piston-magnet unit during the first half of the stroke and that during the second half this kinetic energy is transformed into electrical energy. Assuming an average pressure $<P>$ psia in cylinder 11A of FIG. 3 with cross-sectional area A sq. in., the average force will be $F = A<P>$ lb. If the weight of the two pistons, rod and magnet is w, then from Newton's second law $F = w/32 <a>$, and the average acceleration of the piston is $<a> = 32/w\ (A<P>)$ ft/s. With this acceleration, a half stroke length s occurs in time t where $s = \frac{1}{2}<a>t^2$ $$\therefore t = \sqrt{\frac{2s}{<a>}} = \sqrt{\frac{2s}{32(A<P>)}} = \frac{1}{4}\sqrt{\frac{s*w}{A<P>}}$$

Figure 3:
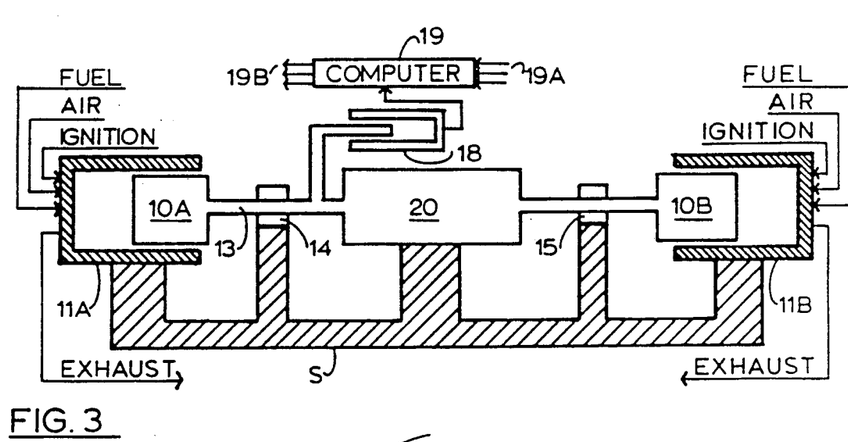
FIG. 3 is a view similar to FIG. 1 but showing an opposed cylinder modification.

If we assume a half stroke length of 4 in., a weight $w = 16$ lb (where two pistons plus a connecting rod weigh 5 lb and the magnet weighs 11 lb) and $A = 12.6$ sq. in. (for a piston diameter of 4 in.) and $<P> = 500$ psia, we obtain $t = 7.3 * 10^{-3}$ s. The second part of the stroke during which energy is transferred to the motor/generator and the fuel-air mixture in cylinder 11A is compressed, takes approximately the same amount of time. The total time for the first complete stroke is about $1.5 * 10^{-2}$ s.

For 2-cycle operation, combustion in cylinder 11B repeats the above process carrying the piston-magnet unit back into cylinder 11A to compress a fuel air charge. Each cylinder may therefore fire up to 66 times per second or 4000 times per minute (corresponding to 4000 rpm for a conventional 2-cycle engine).

For 4-cycle operation, combustion in cylinder 11B repeats the first complete stroke with the exception that now as piston 10A moves toward cylinder 11A, it expels combustion products from cylinder 11A. For the return stroke (to expel combustion products from cylinder 11B) power must be extracted from the battery or other electrical energy storage units to operate the motor/generator in the motor mode and move piston 10B into cylinder 11B. To bring piston 10B into cylinder 11B as quickly as possible the power output of the motor mode must equal the power delivered into the generator in the previous stroke, and the motor should operate for half the stroke (about $7.3 * 10^{-3}$ s) to provide the piston magnet unit with a large velocity (large kinetic energy). During the second part of the stroke this kinetic energy must be extracted by switching the linear motor/generator into generator mode. A second such step is required to move piston 10A back into cylinder 11A to compress a fuel-air charge. During these two steps the motor/generator and battery (or energy storage inductor) function in electrical analogy to the mechanical flywheel of a conventional engine. In 4-cycle operation each cylinder will fire at a maximum rate of almost 2000 times per minute (corresponding to 4000 rpm for a conventional 4-cycle engine). In an actual engine it will in general be advantageous to extract power immediately after ignition (thereby decreasing the maximum speed of the piston).

The above is a worst case analysis using large cylinders with a long stroke. For smaller components which can tolerate higher pressures (since the applied force on the cylinder walls is a product of pressure and area) and for which the stroke length and weights are reduced, the cycle speed can be increased substantially (corresponding to a higher rpm in conventional engines). For example, in a system where the half stroke length is 2 in., the weight of the pistons, rod and magnet is 8 lb and the pressure is 2000 psia the time t for a half stroke is reduced to 1.8 ms (which corresponds to 16000 rpm for a conventional engine). It is noted that the single piston unit (FIG. 1) offers the lowest weight of piston, rod and magnet and therefore promises the highest speed operation. High speed operation is advantageous in that the power output per unit engine weight is increased and particularly because at higher electrical frequencies a smaller iron core may be used in the motor/generator as well as in the drive motors.

The largest component to the weight of the piston-rod-magnet is contributed by the weight of the magnet (or equivalent). The size of the magnet will depend primarily on the design condition that the energy content of the fuel-air mixture within the cylinder multiplied by the actual efficiency factor must equal the energy transfer to the linear motor/generator and/or other electrical energy storage units) during the power stroke. During normal operation the maximum, amount of the energy transfer will be determined by the magnetic energy product (BH) of the material composing the magnet, as well as the design of the linear motor/generator (i.e. the number of poles of the yoke through which the magnet passes and the amount of energy extracted at each set of poles-which in general will not be the same for all pole sets). With these and other relevant design considerations satisfied, the weight of the magnet should be determined to properly match the energy transfer per power stroke to the effective energy content of the fuel-air mixture in the cylinder. In this connection it should be noted that the large advances made recently in increasing the energy product (BH) of the magnetic material Magnequench III contributes significantly to the performance of our proposed engine and that subsequent advances of this kind will further enhance its performance.

In a possible modification of the design presented, the specialized linear motor/generator could be replaced by a specialized rotational motor/generator coupled to the piston rod by means of a mechanism to convert linear to rotational motion (for example by means of a rack and pinion—with a rack mounted on the piston rod and the engaging gear connected to the rotor of the motor/generator). This arrangement has disadvantages in that it adds the mass of the mechanism and rotor to the mass of the piston and rod, and in that the system is no longer free of jerk and backlash.

Figure 4:
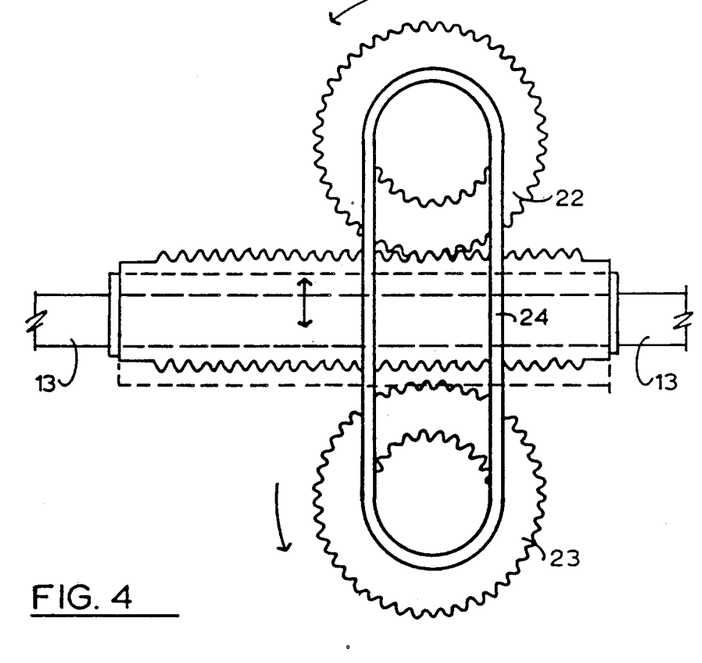
FIG. 4 is a schematic side-elevation of a linear-to-rotational motion converter.

In a preferred embodiment of this arrangement the linear-to-rotational motion converter can include a clutch mechanism to always drive the motor/generator in the same direction. As shown in FIG. 4 the rack 21 is longitudinally slotted to receive the piston rod 13 and slides in the upward direction perpendicular to the rod 13 to engage the top gear 22 (connected to the motor/generator) for a motion of the piston to the right and slides down to engage the lower gear 23 for piston motion to the left cams (not illustrated) can move the rack up and down. The upper and lower gears are connected by a chain belt 24 in order to drive the upper gear counter-clockwise regardless of the direction of the piston motion. In this preferred embodiment the rotor of the motor generator is no longer part of the mass which limits the speed of the engine, thereby allowing considerably higher operating speeds. However the concomitant jerk and backlash makes this system less amenable to computer control and the flywheel effect detracts from precise control of the speed of the piston as a function of its position within the cylinder.

SUMMARY

This invention is the result of the strategic combination of factors including mechanical and electromagnetic design and computer control in a manner to produce a unique optimized engine. Each of the factors represents existing or presently possible technology and therefore, the invention as proposed is within the reach of present day technology. The essence of this invention is the unique combination of the factors required to produce a versatile optimized engine.

It is notoriously difficult to provide exact numerical values for quantities such as the efficiency of an engine and the amount of pollution it might produce, particularly if the engine is constructed in different ways to achieve different aims and if it is operated under different conditions. However it is possible to establish qualitatively that this invention improves on the conventional engine.

(1) The very simple mechanical construction with only one moving part per cylinder in the power train and the simple linear motion allow a very rigid mount with a minimum of friction. This aspect together with a virtually vibrationless module permits very high speed operation resulting in:
(a) a high power output per unit weight of engine;
(b) a low cost of production;
(c) high reliability;
(d) exceedingly quiet and vibrationless operation;
(e) low lubrication requirements;
(f) low cooling requirements;
(g) an absence of jerk and backlash;

(2) Exact control of piston motion, timing etc. as well as auxiliary energy storage and electromagnetic drive result in:
(a) an engine with continuously variablecompression ratio;
(b) an engine with continuously variable timing etc.;
(c) an engine which permits energy recovery i.e. during breaking, waiting for a green light, etc.) and which can operate at optimum speed under varying conditions.

Under conventional operating conditions (conventional-near stoichiometric fuel ratio, conventional compression ratio (about 8:1), conventional fuel gasoline or diesel fuel, we do not expect a considerable improvement in thermodynamic efficiency (i.e. exceeding 10% or 15% ) over a modern well designed engine, well tuned and operating at its optimum speed. However, for most applications and particularly for automotive use, engines are often not well tuned and generally operate at speeds far from optimal (as exemplified by the fact that gasoline efficiency in city driving is far lower than in highway driving ). Therefore, based on factors 2(a), 2(b), and 2(c) above and under practical operating conditions one may expect that the proposed engine, due to its unprecedented versatility, will provide an improvement in fuel efficiency in the range of 30 to 60% over conventional engines. Moreover an additional improvement in the transmission of energy from the engine to the drive motors of the order of 10 to 20% may be achieved through the elimination of a mechanical transmission and drive train and through optimized impedance matching between the engine and drive motors.

In the proposed engine even the differential may be eliminated if two electric drive motors are used, one on each rear wheel with power input to each controlled by computer as a function of steering wheel position etc.

Under novel (non-conventional) operating conditions the thermodynamic efficiency of this engine can be twice as high as that of a conventional engine (i.e. about 60% compared to 30% for a conventional engine). Non-conventional operating conditions include the use of high compression ratios, in the range of 15:1 to 25:1, lean fuel-air ratios, in the range of 40% to 80% of the stoichiometric fuel-air ratio and use of specialty fuels. This claim is substantiated by the fuel-air-cycle data presented by Charles Taylor (in The Internal-Combustion Engine in Theory and Practice pages 2 and 3 1974 M.I.T. Press) which show that thermodynamic efficiencies as high as 64% can be obtained.

Since specialty fuels cannot be introduced in large measure in the short term, compromise solutions using gasoline must be found. The proposed engine is compatible with such solutions. The problem of ignition of lean gasoline-air mixtures can be ameliorated in several ways. For example by employing variable gasoline-air ratio injection into the cylinder. The major part of the charge should be lean but it must be topped up by a small quantity of rich mixture located around the spark plug. Alternately, a pre-combustion chamber (not illustrated) can be used with its own miniature intake valve to supply a small quantity of rich mixture near the spark plug.

In similar manner, the versatility and computer control aspects of this invention can be utilized to enhance pollution control. The most effective way of reducing carbon dioxide emission (by about 70% to 80%) is to improve the overall fuel efficiency as described above and to use fuels such as natural gas (which contains a higher ratio of hydrogen to carbon atoms) and thereby provide a high ratio of thermal energy output to carbon dioxide emission. Sulphur dioxide emission can also be greatly reduced by using clean fuels such as propane or natural gas which have been efficiently scrubbed. Nitrous oxide emission can be reduced by better temperature control, to obtain a better temperature profile (avoid sharp peaks) during and shortly after ignition. In high compression engines these temperatures can be reduced substantially by using lean fuel-air ratios. Lean fuel-air ratios, of course, decrease the performance of an engine. However with the very high speed capability of the proposed engine its overall performance can still remain high.

The above represents a brief analysis and description of the improvements resulting from the invention described herein. Many other improvements and advantages will become apparent to those skilled in the art to which this invention relates.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. In an internal combustion engine which includes at least one cylinder, a piston reciprocal therein, fuel and air intake means operatively connected to said cylinder, exhaust gas means also operatively connected to said cylinder and a source of fuel/air ignition also operatively connected to said cylinder; the improvement comprising in combination, support structure, a connecting rod secured by one end to said piston and reciprocal therewith along a common axis, bearing means mounted on said supporting structure for supporting said connecting rod for reciprocal movement, a transducer in the form of a linear generator, which includes a magnet, operatively secured to said connecting rod and being reciprocal therewith, and a yoke and coil combination mounted on said supporting structure in a stationary, operative relationship with said magnet, a position indicator also on said supporting structure, operatively connected to said connecting rod for indicating at selected locations and/or time intervals, the position, speed and acceleration of said piston rod as a function of time, and computer means operatively connected to said position indicator and to said engine to control the operational characteristics of said engine depending upon the operation requirement parameters at any given time frame of operation.

2. The improvement according to claim 1 in which said position indicator is adapted to control the operation of the associated fuel and air intake means and said ignition means.

3. The improvement according to claim 1 in which said yoke and coil combination surrounds said connecting rod, said magnet being reciprocal within said yoke and coil combination.

4. The improvement according to claim 1 in which said transducer comprises a linear motor/generator, said computer also controlling the function of said transducer between operating as an electrical generator during part of the cycle of said piston and connecting rod such as during the power stroke thereof, and as an electrical motor during the remainder of the cycle of said piston and connecting rod.

5. The improvement according to claim 2 in which said transducer comprises a linear motor/generator, said computer also controlling the function of said transducer between operating as an electrical generator during part of the cycle of said piston and connecting rod such as during the power stroke thereof, and as an electrical motor during the remainder of the cycle of said piston and connecting rod.

6. The improvement according to claim 3 in which said transducer comprises a linear motor/generator, said computer also controlling the function of said transducer between operating as an electrical generator during part of the cycle of said piston and connecting rod such as during the power stroke thereof, and as an electrical motor during the remainder of the cycle of said piston and connecting rod.

7. The improvement according to claim 1 in which the associated internal combustion engine includes a pair of spaced apart opposing cylinders and a piston reciprocal in each cylinder; the improvement includes said connecting rod being connected by each end thereof to one of said pistons, along a common axis, said transducer being situated substantially centrally along the length of said connecting rod.

8. The improvement according to claim 2 in which the associated internal combustion engine includes a pair of spaced apart opposing cylinders and a piston reciprocal in each cylinder; the said improvement includes said connecting rod being connected by each end thereof to one of said pistons, along a common axis, said transducer being situated substantially centrally along the length of said connecting rod.

9. The improvement according to claim 3 in which the associated internal combustion engine includes a pair of spaced apart opposing cylinders and a piston reciprocal in each cylinder; the said improvement includes said connecting rod being connected by each end thereof to one of said pistons, along a common axis, said transducer being situated substantially centrally along the length of said connecting rod.

10. The improvement according to claim 4 in which the associated internal combustion engine includes a pair of spaced apart opposing cylinders and a piston reciprocal in each cylinder; the said improvement includes said connecting rod being connected by each end thereof to one of said pistons, along a common axis, said transducer being situated substantially centrally along the length of said connecting rod.

11. An internal combustion engine which includes at least one cylinder, a piston reciprocal therein, fuel and air intake means operatively connected to said cylinder, means to exhaust gases from said cylinder and a source of fuel/air ignition also operatively connected to said cylinder, a connecting rod secured by one end thereof to said piston and reciprocal therewith along a common axis, bearing means mounted on said supporting structure for supporting said rod for said reciprocal movement, a transducer in the form of a linear generator, which includes a magnet, operatively secured to said connecting rod and being reciprocal therewith, and a yoke and coil combination mounted on said supporting structure in a stationary, operative relationship with said magnet, a position indicator also on said supporting structure operatively connected to said connecting rod for indicating at selected locations and/or time intervals, the position, speed and acceleration of said piston rod as a function of time, and computer means operatively connected to said position indicator and to said engine to control the operational characteristics of said engine depending upon the operating requirement parameters at any given time frame of operation.

12. The internal combustion engine according to claim 11 in which said position indicator is adapted to control the operation of the associated fuel and air intake means and said ignition means.

13. The internal combustion engine according to claim 11 in which said yoke and coil combination surrounds said connecting rod, said magnet being reciprocal within said yoke and coil combination.

14. The internal combustion engine according to claim 11 in which said transducer comprises a linear motor/generator, said computer also controlling the function of said transducer between operating as an electrical generator during part of the cycle of said piston and connecting rod such as during the power stroke thereof, and as an electrical motor during the remainder of the cycle of said piston and connecting rod.

15. The internal combustion engine according to claim 12 in which said transducer comprises a linear motor/generator, said computer also controlling the function of said transducer between operating as an electrical generator during part of the cycle of said piston and connecting rod such as during the power stroke thereof, and as an electrical motor during the remainder of the cycle of said piston and connecting rod.

16. The internal combustion engine according to claim 13 in which said transducer comprises a linear motor/generator, said computer also controlling the function of said transducer between operating as an electrical generator during part of the cycle of said piston and connecting rod such as during the power stroke thereof, and as an electrical motor during the remainder of the cycle of said piston and connecting rod.

17. The internal combustion engine according to claim 11 which includes at least one pair of spaced apart opposing cylinders along a common axis, a connecting rod, a piston secured to each end of said connecting rod and each being reciprocal in one of said cylinders, along a common axis, said transducer being situated substantially centrally along the length of said connecting rod.

18. The internal combustion engine according to claim 17 in which said position indicator is adapted to control the operation of the associated fuel and air intake means and said ignition means.

19. The internal combustion engine according to claim 17 in which said yoke and coil combination surrounds said connecting rod, said magnet being reciprocal within said yoke and coil combination.

20. The internal combustion engine according to claim 17 in which said transducer comprises a linear motor/generator, said computer also controlling the function of said transducer between operating as an electrical generator during part of the cycle of said piston and connecting rod such as during the power stroke thereof, and as an electrical motor during the remainder of the cycle of said piston and connecting rod.

21. A hybrid computer controlled internal combustion engine comprising:
 (a) at least one cylinder;
 (b) exhaust means to exhaust gases from the cylinder operatively connected to the cylinder;
 (c) fuel and air intake means for injection of fuel-air mixtures into the cylinder;
 (d) fuel-air ignition means operatively connected to the cylinder;
 (e) a piston reciprocable in the cylinder;
 (f) sensor means for sensing engine operating parameters and for providing a sensor output signal correlatable with the engine operating parameters;
 (g) a generator/motor transducer means with a first movable part operatively coupled to the piston and being reciprocal therewith, and a second stationary part adapted to be electrically coupled to external power sources and power loads, for converting kinetic energy of the first part into electrical energy from the second part and vice versa; and
 (h) on-line computer-operated control means operatively connected to the sensor means and to the engine for monitoring the sensor output signal and for optimizing operation of the engine by controlling the engine operating parameters including the parameters of the generator/motor transducer means.

22. The hybrid engine according to claim 21, where the control means includes means for controlling transducer mode switching from motor to generator and vice versa with switching times correlatable with piston position and velocity.

23. The hybrid engine according to claim 21, wherein the sensor means comprises piston position sensor means for sensing piston position.

24. The hybrid engine according to claim 23, wherein the control means includes means for performing first time differentiation of the sensor output signal to determine piston velocity.

25. The hybrid engine according to claim 24, wherein the control means includes means for performing second time differentiation of the sensor signal output to determine piston acceleration.

26. The hybrid engine according to claim 21, wherein the control means includes means for adjusting the engine operating parameters to operate on a plurality of carbon based fuels with varying carbon to hydrogen atomic ratios.

27. The hybrid engine according to claim 21, wherein the control means includes means for controlling fuel-air compression ratio.

28. The hybrid engine according to claim 21, wherein the control means includes means for controlling ignition timing.

29. The hybrid engine according to claim 21, wherein the control means includes means for controlling piston stroke length and thereby controlling the displacement volume.

30. The hybrid engine according to claim 21, wherein the control means includes means for controlling opening/closing times of engine valves.

31. The hybrid engine according to claim 21, wherein the computer control means includes means for switching the generator power output locations with switching times correlatable with engine load requirements.

32. The hybrid engine according to claim 21, wherein the second part of the transducer means comprises a plurality of discrete wire loop elements adapted to be interconnected and electrically coupled to supplementary energy storage devices and power loads.

33. The hybrid engine according to claim 32, wherein the computer control means includes means for switching the coil elements into multiple series and parallel configurations.

34. The hybrid engine according to claim 21, wherein the control means comprises means for controlling engine operating parameters to minimize pollution output to a defined level commensurate with otherwise maintaining maximum engine efficiency.

35. The hybrid engine according to claim 34, wherein the sensor means comprises exhaust sensor means for sensing the exhaust output and for generating an exhaust output signal receivable by said control means.

36. The improvement according to claim 1 in which said computer means is adapted to control the operation of the associated fuel and air intake means and said ignition means.

37. The internal combustion engine according to claim 11 in which said computer means is adapted to control the operation of the associated fuel and air intake means and said ignition means.

38. The hybrid engine according to claim 21 which includes at least one pair of spaced apart opposing cylinders along a common axis, a connecting rod, a piston secured to each end of said connecting rod and each being reciprocal in one of said cylinders, along a common axis, said transducer means being situated substantially centrally along the length of said connecting rod.

* * * * *